United States Patent [19]

Ohta et al.

[11] Patent Number: 4,833,912
[45] Date of Patent: May 30, 1989

[54] FLOW MEASURING APPARATUS

[75] Inventors: Minoru Ohta, Okazaki; Michitoshi Onoda, Toyohashi; Kazuhiko Miura, Aichi; Tadashi Hattori, Okazaki, all of Japan

[73] Assignee: Nippon Soken, Inc., Nishio, Japan

[21] Appl. No.: 145,118

[22] Filed: Jan. 19, 1988

[30] Foreign Application Priority Data

Jan. 19, 1987 [JP] Japan .................... 62-8130

[51] Int. Cl.$^4$ .................. G01M 15/00; G01F 1/68
[52] U.S. Cl. .................. 73/118.2; 73/204.16; 73/204.26
[58] Field of Search .................. 73/118.2, 204

[56] References Cited

U.S. PATENT DOCUMENTS

| | | |
|---|---|---|
| 4,261,199 | 4/1981 | Sauer et al. . |
| 4,399,697 | 8/1983 | Kohama et al. ............... 73/204 |
| 4,412,449 | 11/1983 | Eiermann et al. . |
| 4,478,077 | 10/1984 | Bohrer et al. . |
| 4,498,337 | 2/1985 | Gruner . |
| 4,527,427 | 7/1985 | Grunwald . |
| 4,538,456 | 9/1985 | Gneiss et al. . |
| 4,587,842 | 5/1986 | Handtmann . |
| 4,596,138 | 6/1986 | Ito et al. ............... 73/118.1 |
| 4,627,279 | 12/1986 | Ohta et al. . |
| 4,688,425 | 8/1987 | Kanehara et al. . |
| 4,691,566 | 9/1987 | Aine ............... 73/204 |
| 4,693,115 | 9/1987 | Tokura et al. . |
| 4,693,116 | 9/1987 | Miura et al. ............... 73/204 |
| 4,705,713 | 11/1987 | Ohta et al. . |
| 4,715,224 | 12/1987 | Kuhn ............... 73/204 |

FOREIGN PATENT DOCUMENTS

| | | |
|---|---|---|
| 0094497 | 11/1983 | European Pat. Off. . |
| 3515206 | 10/1985 | Fed. Rep. of Germany . |
| 1245138 | 9/1971 | United Kingdom . |
| 2025062 | 1/1980 | United Kingdom . |

Primary Examiner—Herbert Goldstein
Attorney, Agent, or Firm—Cushman, Darby & Cushman

[57] ABSTRACT

A flow measuring apparatus includes a resistance layer for detecting a flow rate within a passage and an additional resistance layer for burning off deposits formed by suspended particles the like, and both of the resistance layers are formed on only one substrate. When suspended particles are deposited on the substrate to form deposits thereon, the deposits are burned off and removed from the substrate by supplying power to the additional resistance layer.

17 Claims, 17 Drawing Sheets

CRANK ANGLE SIGNAL

OUTPUT OF COMPARATOR 913'

$V_Q$

FLOW MEASURING APPARATUS

BACKGROUND OF THE INVENTION

1. Field of the Invention

The present invention relates to a flow measuring apparatus having a film resistor which serves as a temperature detecting means as well as an electric heater. Such a flow measuring apparatus can be used, for example, for measuring the flow rate of engine intake air.

2. Description of the Related Art

Generally, in an internal combustion engine, the amount of intake air is one of the most important parameters for controlling the fuel injection amount, the ignition timing, or the like. A flow measuring apparatus, i.e., an airflow meter, is provided for measuring the same. One of the more common prior art airflow meters is the vane-type, but this is disadvantageous in scale, response speed characteristics, and the like, and therefore, airflow meters having temperature-dependent resistors have been developed, in which these disadvantages of scale, response speed characteristics, and the like are avoided.

A prior art airflow meter may consist of a film resistor which serves not only as an electric heater, but also as a temperature-detecting means for detecting the temperature of the heated air. The airflow meter may consist of a temperature-dependent resistor for detecting the temperature of non-heated air. Thus, the current flowing through the film resistor is controlled to provide a constant difference in temperature between the film resistor and the temperature dependent resistor, thereby detecting the voltage applied to the film resistor as representing the mass flow rate of air. In this airflow meter, if a temperature-dependent resistor is not provided and the current of the heater resistor is controlled to provide a constant temperature of the film resistor, the voltage applied to the film resistor is detected as representing the volume flow rate of air (see: U.S. Pat. Nos. 4,627,279 and 4,688,425).

In the above-mentioned airflow meter, the film resistor may consist of an insulating substrate such as a ceramic substrate or monocrystalline silicon substrate, a resistance layer of platinum (Pt), gold (Au), etc. on the insulating substrate, and a passivation layer on the resistance pattern. In this airflow meter, the flow rate of air is remarkably reduced around a stagnation region or at an edge on the upstream side around boundary regions. Therefore, suspended particles (mainly, carbon particles) in the air stream easily deposit on the film resistor near the stagnation region and the boundary regions. As a result, the heat capacity is increased and the heat dissipation characteristic thereof is reduced, thus reducing the sensitivity and response speed characteristics of the airflow meter.

SUMMARY OF THE INVENTION

It is an object of the present invention to provide a flow measuring apparatus maintaining the necessary sensitivity and response characteristics.

According to the present invention, in a flow measuring apparatus including a resistance layer formed on a substrate for detecting a flow rate within a passage, a resistance layer for burning off deposits formed by suspended particles is also formed on the same substrate. Thus, when suspended particles (mainly, carbon particles) are deposited on the substrate, the deposits formed by such suspended particles are burned off and removed from the substrate by supplying power to the burn-off resistance layer.

BRIEF DESCRIPTION OF THE DRAWINGS

The present invention will be more clearly understood from the description as set forth below with reference to the accompanying drawing, wherein.

DESCRIPTION OF THE PREFERRED EMBODIMENTS

Figure 1:
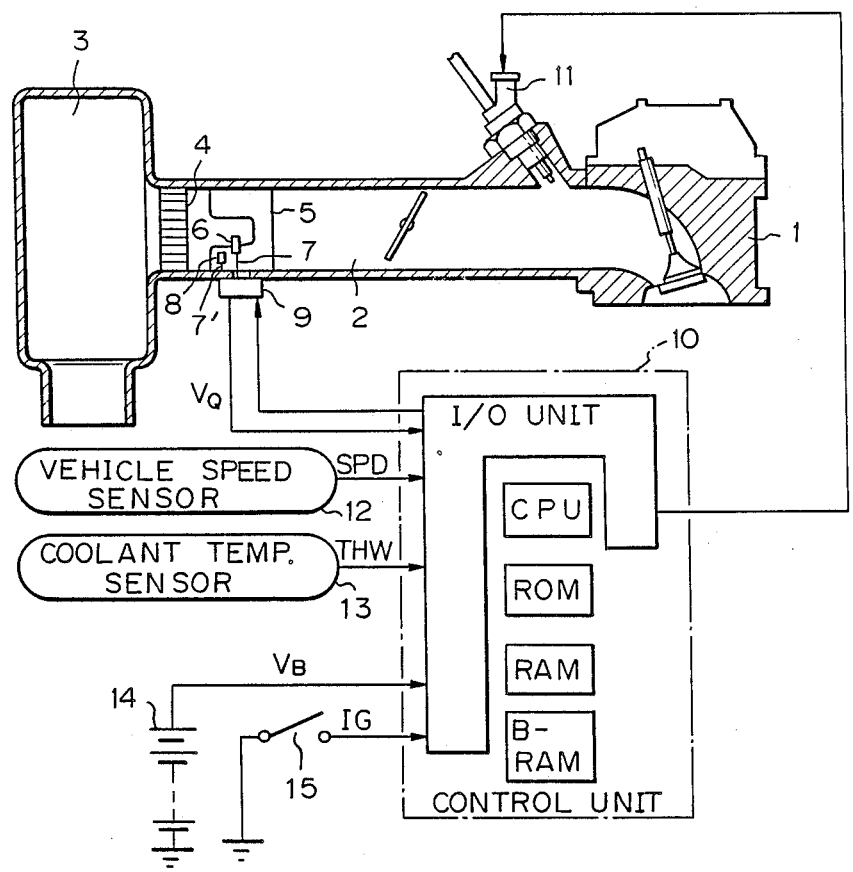
FIG. 1 is a schematic diagram showing the overall configuration of an internal combustion engine to which the flow measuring apparatus according to the present invention is applied.

In FIG. 1, which illustrates the overall configuration of an internal engine to which the flow measuring apparatus according to the present invention is applied, reference numeral 1 designates a spark ignition engine for driving an automobile in which air for combustion is sucked into an intake air passage 2 through an air cleaner 3 and a rectifier grid 4 for making the air flow uniform.

A flow measuring apparatus includes a sensing portion inside of the intake air passage 2 and a sensor circuit 9 encapsulated in a hybrid board outside of the intake air passage 2. The sensing portion includes a supporting member 5 (such as Molybdenum) which supports a temperature-dependent resistor (resistance layer) 6 in the intake air passage 4. The film resistor 6, which includes a heating and temperature-detecting portion, is connected via a flexible connection 7 to the sensor circuit 9. The supporting member 5 also supports a temperature-dependent resistor (resistance layer) 8 for detecting the temperature of non-heated air in the intake air passage 2. The temperature-dependent resistor 8 is connected via a flexible connection 7' to the sensor circuit 9. Note that the temperature-dependent resistor 8 is disposed within the intake air passage 4 in such a way that the resistor 8 is not substantially affected by the heat generated from the film resistor 6, and there is no substantial fluctuation of the air stream against the film resistor 6.

The sensor circuit 9 controls the current flowing to the film resistor 6 to generate heat to provide a constant difference in temperature between the film resistor 6 and the temperature-dependent resistor 8. Also, the sensor circuit 9 generates and transmits an output voltage $V_Q$ to a control circuit 10.

The control circuit 10 may be constructed by a microcomputer which comprises a control processing unit (CPU), a read-only memory (ROM) for storing programs, constants, and the like, a random access memory (RAM) for storing temporary data, a backup RAM, an input/output unit including an analog-to-digital converter, and the like. The control circuit 10 also receives various kinds of signals such as a vehicle speed signal SPD from a vehicle speed sensor 12, a coolant temperature signal THW from a coolant temperature sensor 13, a battery voltage $V_B$ from a battery 14, and an ignition signal IG from an ignition switch 15, and controls the valve opening time period of a fuel injection valve 11 and the like.

Figures 2A, 2B:
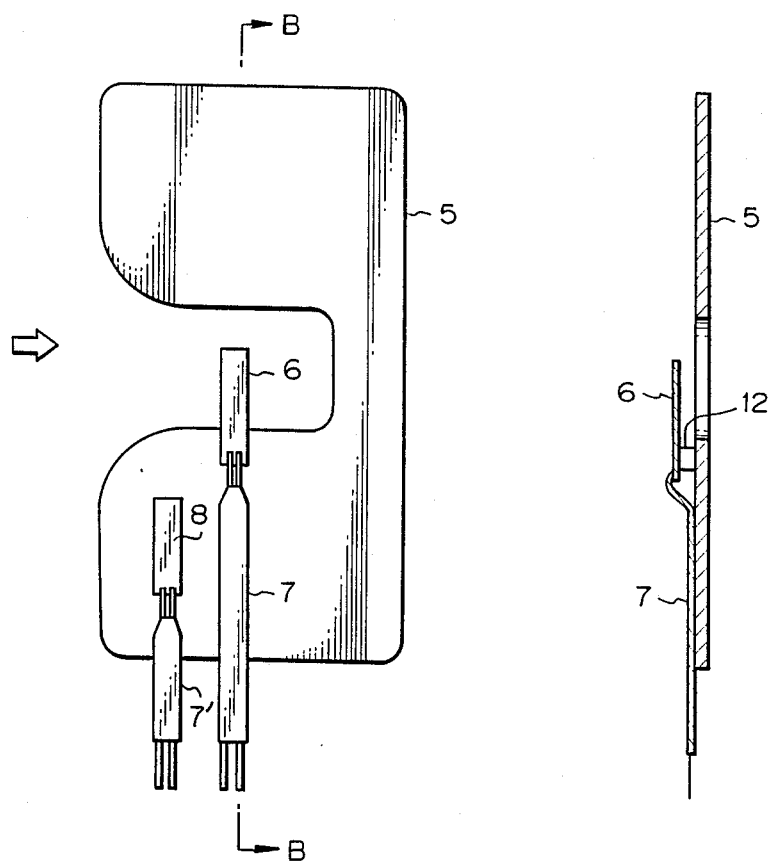
FIG. 2A is an enlargement of a pair of the flow measuring apparatus of FIG. 1.
FIG. 2B is a cross-sectional view taken along line B—B of FIG. 2A.

FIG. 2A is an enlargement of FIG. 1 in the periphery of the film resistor 6, and FIG. 2B is a cross-sectional view taken along the line B—B of FIG. 2A. As illustrated in FIGS. 2A and 2B, only one end of the film resistor 6 is supported by an adiabatic member 12 in the supporting member 5, so that the face thereof having a resistance pattern thereon is parallel to the air stream, i.e., the minimum dimension portion of the film resistor 6 is opposed to the air stream. Note that, if both of the ends of the film resistor 6 are fixed to the supporting member 5, the sensor output is changed by the strain gauge effect of the film resistor 6, i.e., the strain of the film resistor 6. The support of the film resistor 6 by only one end thereof avoids this strain gauge effect.

Also, each of the flexible connections 7 and 7' is comprised of a conductor (such as Cu) having a pattern thereon sandwiched by two flexible insulating resin films, and therefore, have a structure resistant to erosion, disconnection, and the like, compared with bonding wires.

Figure 3A:
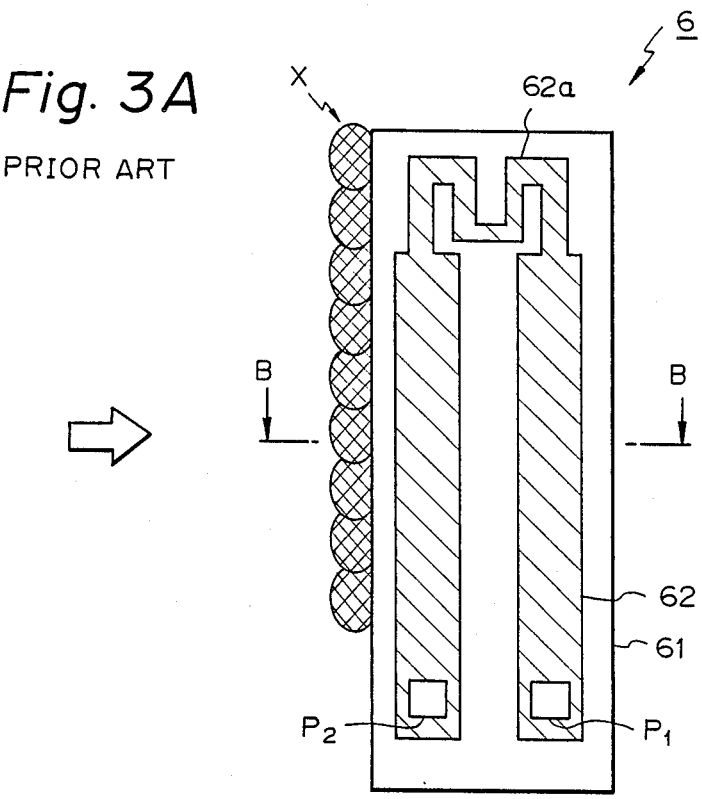
FIG. 3A is a plan view of a prior art film resistor.
Figure 3B:
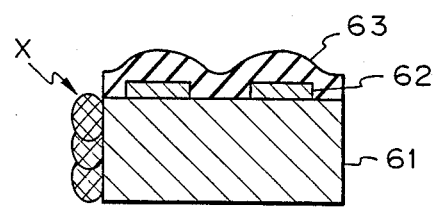
FIG. 3B is a cross-sectional view taken along the line B—B of FIG. 3A.

FIG. 3A is a plan view of a prior art film resistor, and FIG. 3B is a cross-sectional view taken along the line B—B of FIG. 3A. As illustrated in FIGS. 3A and 3B, the film resistor 6 is comprised of a monocrystalline silicon substrate 61, a platinum (Pt) resistance pattern layer 62, and a passivation layer ($SiO_2$ or $Si_3N_4$) 63 for protecting the Pt resistance pattern layer 62. Note that, in this case, the $SiO_2$ layer (not shown) obtained by thermally-oxidizing the substrate 61 is provided between the substrate 61 and the Pt resistance pattern layer 62. In the Pt resistance pattern layer 62, the portion 62a thereof having a particularly large resistance value serves not only as a heater by receiving a power supply, but also as a temperature-detecting portion by detecting a resistance value thereof. References $P_1$ and $P_2$ designate pads for lead portions.

In the above-mentioned film resistor 6, the flow rate of air is remarkably reduced around a stagnation region or at an edge on the upstream side around boundary regions. Therefore, suspended particles in the air stream easily deposit on the film resistor 6 near the stagnation region and the boundary regions as indicated by arrows X, thereby increasing the heat capacity and reducing the heat dissipation characteristics, unless the particles are removed from the film resistor 6.

Figure 4A:
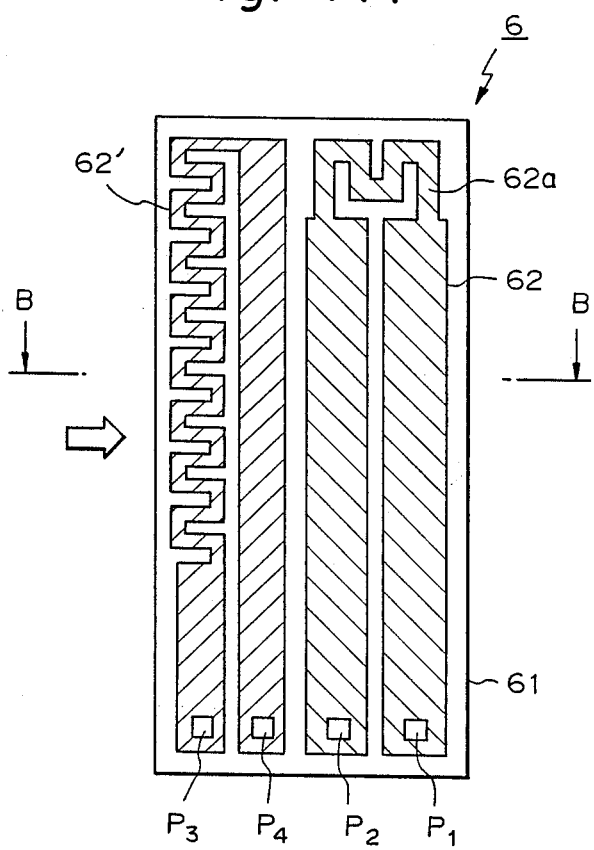
FIG. 4A is a plan view illustrating a first embodiment of the film resistor according to the present invention.
Figure 4B:
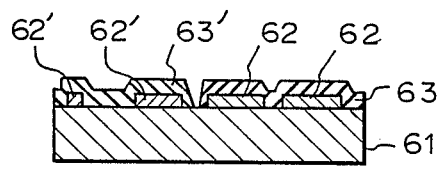
FIG. 4B is a cross-sectional view taken along the line B—B of FIG. 4A.

FIG. 4A is a plan view illustrating a first embodiment of the film resistor according to the present invention, and FIG. 4B is a cross-sectional view taken along the line B—B of FIG. 4A. In FIGS. 4A and 4B, in addition to the Pt resistance pattern layer 62 for detecting a flow rate, a Pt resistance pattern layer 62' for burning off deposits formed by suspended particles is provided. In addition, these Pt resistance patterns 62 and 62' are covered by separate passivation layers 63 and 63'. As a result, when suspended particles are adhered to the upstream side of the film resistor 6, a current is supplied to the Pt resistance pattern layer 62' so that the upstream side of the film resistor 6 is heated to about 400° to 800° C., thus burning off or removing the suspended particles. Also, since the passivation layer 63' is separated from the passivation layer 63, even when cracks and the like are generated by the thermal impact due to the current flowing through the Pt resistance pattern layer 62', the passivation layer 63 for protecting the Pt resistance pattern layer 62 is little affected by the cracks and the like generated in the passivation layer 62' Reference $P_3$ and $P_4$ designate pads for lead portions of the Pt resistance patterns 62'.

In FIGS. 4A and 4B, note that a Pt resistance layer for the Pt resistance pattern layers 62 and 62' is deposited on the $SiO_2$ layer (not shown) on the substrate, and thereafter, is separated into the layers 62 and 62' by etching. Also, a passivation layer for the passivation layers 63 and 63' is deposited on the Pt resistance pattern layers 62 and 62', and thereafter, is separated into the layers 63 and 63' by etching.

Figure 5A:
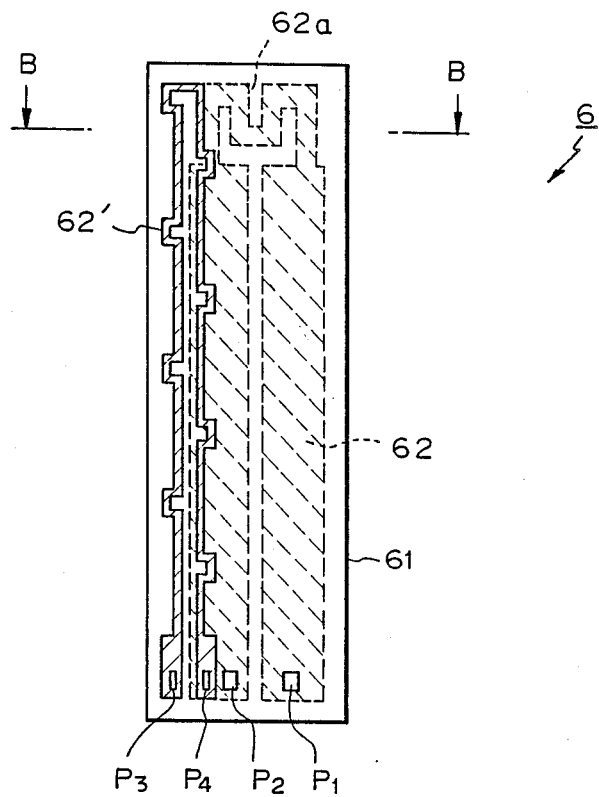
FIG. 5A is a plan view illustrating a second embodiment of the film resistor according to the present invention.
Figure 5B:
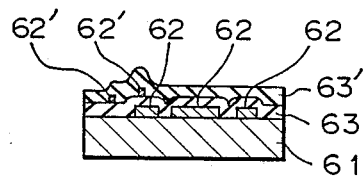
FIG. 5B is a cross-sectional view taken along the line B—B of FIG. 5A.

FIG. 5A is a plan view illustrating a second embodiment of the film resistor according to the present invention, and FIG. 5B is a cross-sectional view taken along the line B—B of FIG. 5A. In FIGS. 5A and 5B, the Pt resistance pattern layer 62' for the burn-off is stacked partly on the Pt resistance pattern layer 62 for the detection of a flow rate. That is, the Pt resistance pattern layer 62' is formed on the passivation layer 63 and partly on the Pt resistance pattern layer 62.

Note that, generally, as illustrated in FIGS. 3A and 3B, suspended particles are deposited on the upstream side of the film resistor 6 where stagnation regions are generated, but such suspended particles are not deposited on the front surface, the back surface, or the downstream side of the film resistor 6. Therefore, in order to effectively burn off deposits formed by suspended particles, the Pt resistance pattern layer 62' for the burn-off must be located upstream of the substrate 61. This also contributes to a reduction of the power consumption. Thus, due to the stacked configuration of the Pt resistance pattern layers 62 and 62', the connections can be easily carried out without increasing the mass of the film resistor 6. Therefore, dirt can be effectively removed from the film resistor 6 to maintain a highly sensitive sensor chip.

Figure 6A:
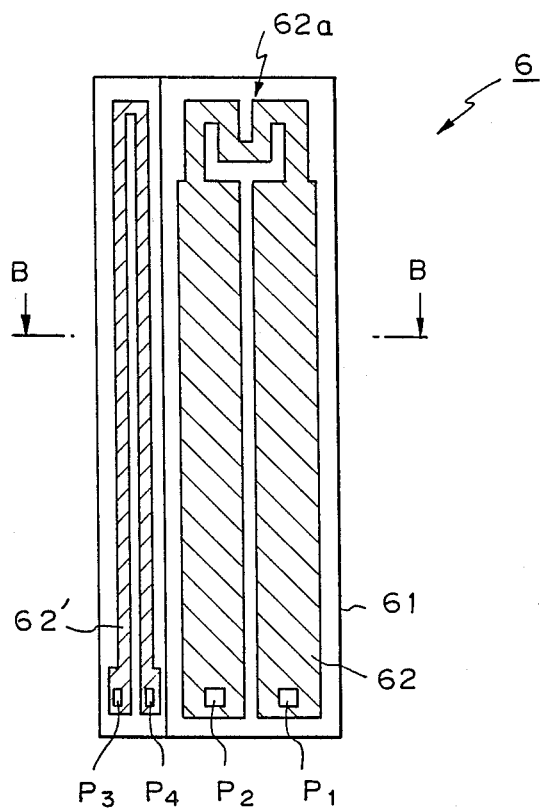
FIG. 6A is a plan view illustrating a third embodiment of the film resistor according to the present invention.
Figure 6B:
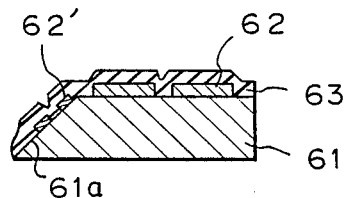
FIG. 6B is a cross-sectional view taken along the line B—B of FIG. 6A.

FIG. 6A is a plan view illustrating a third embodiment of the film resistor according to the present invention, and FIG. 6B is a cross-sectional view taken along the line B—B of FIG. 6A. In FIGS. 6A and 6B, a taper 61a is provided on the upstream side of the substrate 61, and the burn-off Pt resistance pattern 62' is formed thereon. Thus, stagnation regions or boundary regions are avoided or suppressed on the upstream side of the film resistor 6 by the upstream-side taper 61a, and accordingly, the adhesion of suspended particles in the air stream to the film resistor 6 is avoided or decreased by the upstream-side taper 61a. Also, even when suspended particles are adhered to the film resistor 6, deposits by such particles are burned off in a short time. Note that the taper 61a is obtained by performing anisotropic etching upon the silicon monocrystalline substrate 61. For example, if the flat surface of the silicon monocrystalline substrate 61 is the face (100) or (110), the taper 61a is the face (111). That is, the anisotropic etching uses a difference in etching speed, i.e., the etching speed of the face (111) of monocrystalline silicon is very small compared with that of the face (100) or (110) thereof. Although the above-mentioned taper is obtained by the face (111) of polycrystalline silicon, it can be also obtained by performing a suitable mechanical process upon polycrystalline silicon.

Figure 7A:
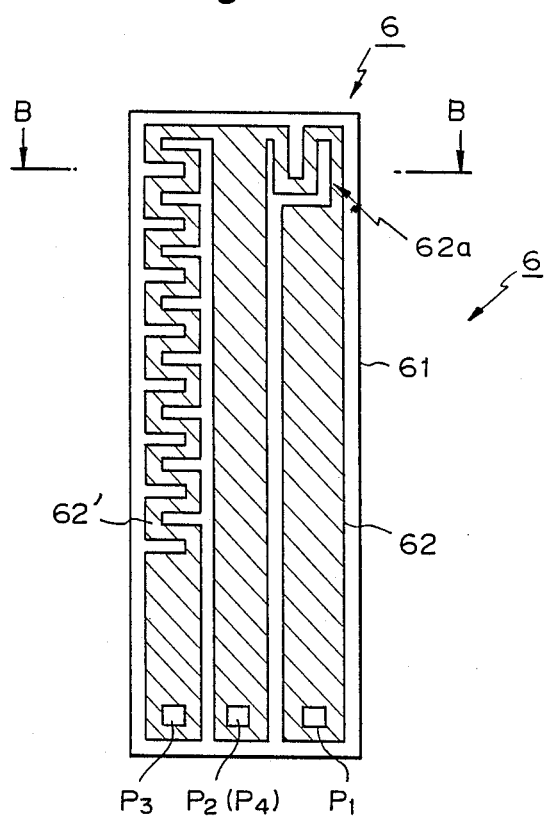
FIG. 7A is a plan view illustrating a fourth embodiment of the film resistor according to the present invention.
Figure 7B:
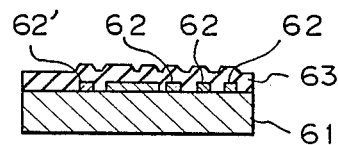
FIG. 7B is a cross-sectional view taken along the line B—B of FIG. 7A.

FIG. 7A is a plan view illustrating a fourth embodiment of the film resistor, and FIG. 7B is a cross-sectional view taken along the line B—B of FIG. 7A. In FIGS. 7A and 7B, a modification of FIGS. 4A and 4B is illustrated. That is, a lead portion of the flow rate detection Pt resistance pattern layer 62 and a lead portion of the burn-off Pt resistance pattern layer 62' are common. As a result, the pad $P_2$ of FIG. 4A also serves as the pad $P_4$ of FIG. 4A. Thus, the mass of the film resistor 6 is reduced, thereby realizing a more effective burning off of dirt (suspended particles).

Figure 8A:
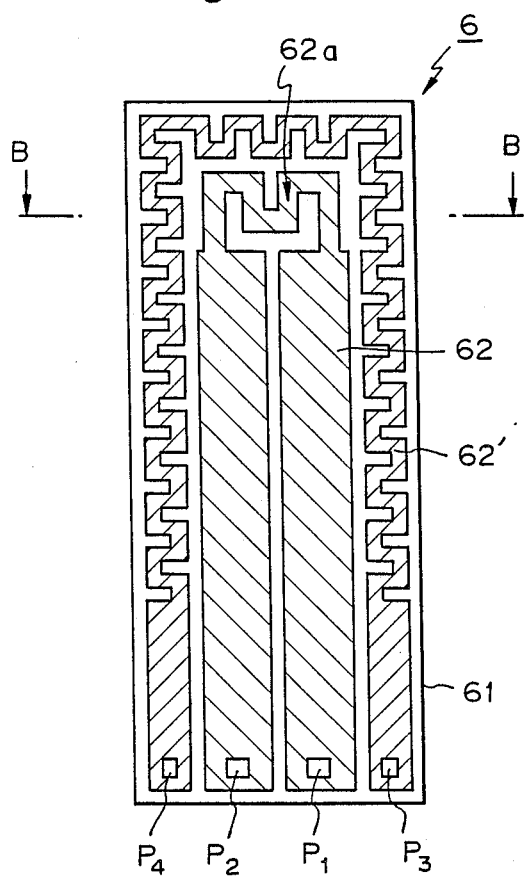
FIG. 8A is a plan view illustrating a fifth embodiment of the film resistor according to the present invention.
Figure 8B:
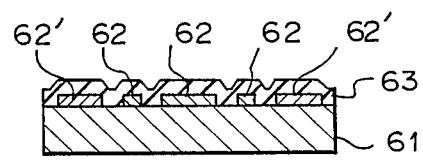
FIG. 8B is a cross-sectional view taken along the line B—B of FIG. 8A.

FIG. 8A is a plan view illustrating a fifth embodiment of the film resistor, and FIG. 8B is a cross-sectional view taken along the line B—B of FIG. 8A. In FIGS. 8A and 8B, the flow rate detection Pt resistance pattern layer 62 is surrounded by the burn-off Pt resistance pattern layer 62'. Thus, suspended particles adhered to the entire circumference can be burned off uniformly. That is, if backfiring or valve overlap occur after acceleration, deposits formed by suspended particles adhered to the film resistor 6 due to a blow back of the combustion gas can be burned off.

The sensor circuit 9 of FIG. 1 will be explained with reference to FIG. 9. The sensor circuit 9 is comprised of a flow rate detection circuit 91 and a burn-off circuit 92.

The flow rate detection circuit 9 includes resistors 911 and 912 which form a bridge circuit with the Pt resistance pattern layer 62 and the temperature-dependent resistor 8; a comparator 913; a power transistor 914 controlled by the comparator 913; a resistor 915; and a voltage buffer 916. The flow rate detection circuit 91 operates as follows. When the amount of air flowing through the intake air passage 2 increases, thus reducing the temperature of the Pt resistance pattern layer 62, the resistance value thereof decreases so as to satisfy the following condition:

$$V_1 \leq V_2$$

where $V_1$ is a potential at the node between the resistor 911 and the Pt resistance pattern layer 62, and $V_2$ is the potential at the node between the resistor 912 and the temperature-dependent resistor 8. As a result, the output potential of the comparator 913 is reduced, thereby increasing the conductivity of the transistor 914. Therefore, the heat generated by the Pt resistance pattern layer 62 is increased and, simultaneously, the collector potential of the transistor 914 is increased, so that the output voltage $V_Q$ of the voltage buffer 916 is also increased.

Contrary to this, when the amount of air flowing through the intake air passage 2 decreases, thus increasing the temperature of the Pt resistance pattern layer 62, the resistance value thereof increases so as to satisfy the following condition:

$$V_1 > V_2.$$

As a result, the output potential of the comparator 913 is increased, thereby decreasing the conductivity of the transistor 914. Therefore, the heat generated by the Pt resistance pattern layer 62 is decreased and, simultaneously, the collector potential of the transistor 914 is decreased, so that the output voltage $V_Q$ of the voltage buffer 916 is also decreased.

Thus, feedback control is performed upon the temperature of the Pt resistance pattern layer 62 to provide a constant difference in temperature between the Pt resistance pattern layer 62 and the temperature-dependent resistor 8, which, in this case, detects the temperature of the ambient air. Thus, the output voltage $V_Q$ of the output buffer 916 indicates the amount of air flowing through the intake air passage 2.

The burn-off circuit 92 includes resistors 921, 922, and 923 which form a bridge circuit with the Pt resistance pattern layer 62', a comparator 924, a flip-flop 925 for receiving the output of the comparator 924 and a burn-off indication signal, and a power transistor 926 controlled by the output of the flip-flop 925. That is, when a burn-off indication signal $S_B$ is supplied from the control circuit 10 to the flip-flop 925, the flip-flop 925 is set to turn ON the power transistor 926. As a result, a power supply voltage $V_{CC}$ is applied to the bridge circuit formed by the Pt resistance pattern 62' and the resistors 921, 922, and 923, thus initiating a burn-off operation by increasing the temperature of the Pt resistance pattern layer 62'. In this case, the resistance value thereof increases so as to satisfy the following condition:

$$V_4 > V_3$$

where $V_3$ is the potential at the node between the resistors 921 and 922, and $V_4$ is the potential at the node between the resistor 923 and the Pt resistance pattern layer 62'. As a result, the flip-flop 915 is reset by the output of the comparator 924, thus completing the burn-off operation by stopping the application of the power supply voltage $V_{CC}$ to the bridge circuit. Note that the temperature of the Pt resistance pattern layer 62' during a burn-off operation can be brought within a range of 400° C. to 800° C. by adjusting the resistance values of the resistors 921, 922, and 923. Therefore, suspended particles adhered to the film resistor 6 can be burned off.

Figure 9:
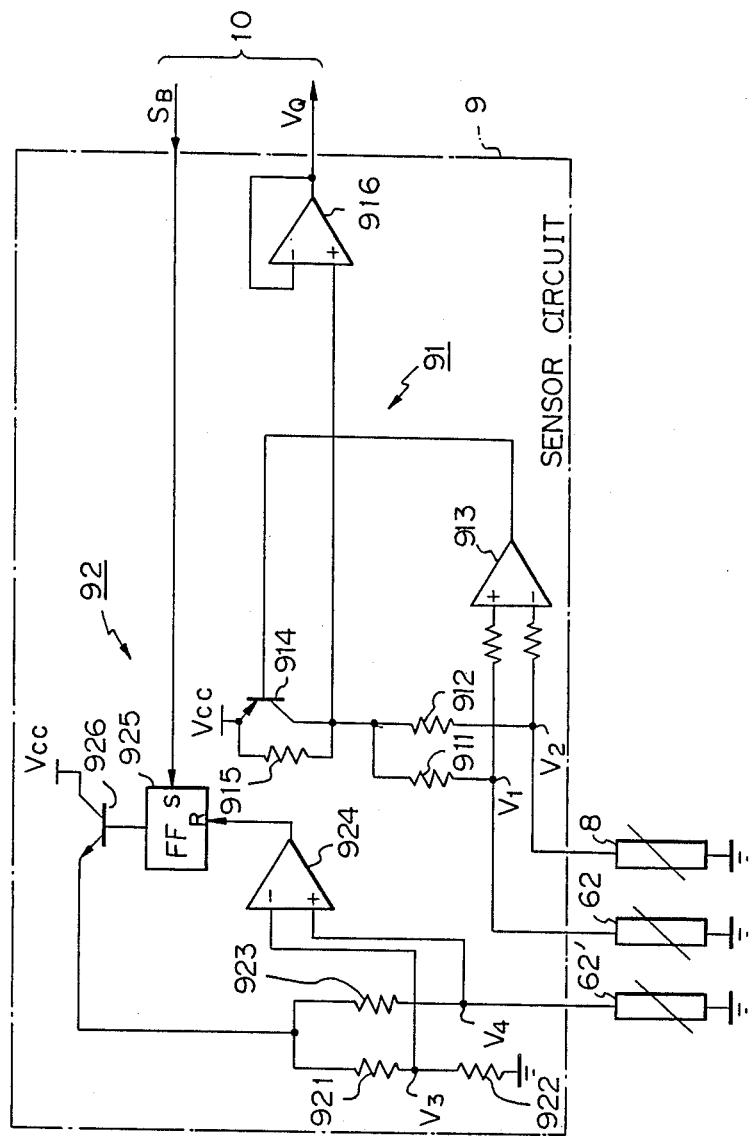
FIGS. 9 and 10 are circuit diagrams showing examples of the sensor circuit of FIG. 1.
Figure 10:
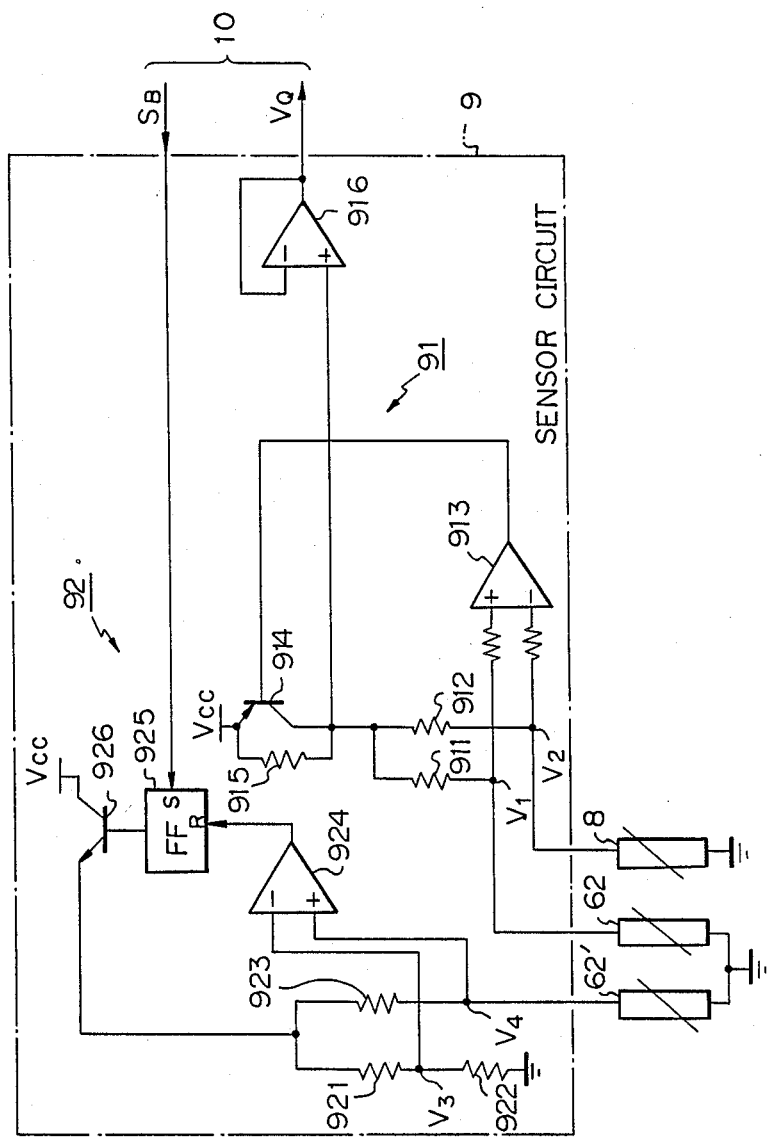

If the film resistor as illustrated in FIGS. 7A and 7B is used, the sensor circuit 9 of FIG. 9 is modified as illustrated in FIG. 10. In FIG. 10, the Pt resistance pattern layers 62 and 62' are commonly grounded. Note that the operation of the sensor circuit 9 of FIG. 10 is the same as that of the sensor circuit 9 of FIG. 9.

The operation of the control circuit 10 of FIG. 1 wherein the sensor circuit 9 of FIG. 9 (or 10) is used will be explained with reference to FIGS. 11 and 12.

Figure 11:
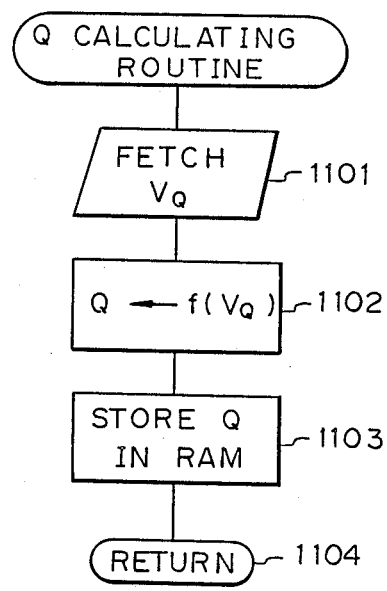
FIGS. 11 and 12 are flowcharts showing the operation of the control circuit of FIG. 1, where the sensor circuit of FIGS. 9 or 10 is applied to the sensor circuit of FIG. 1.

In FIG. 11, which is a routine for calculating an intake air amount Q executed at every predetermined time period, at step 1101, an A/D conversion is performed upon the sensing voltage $V_Q$ of the sensor circuit 9, and at step 1102, the A/D converted $V_Q$ is converted into intake air amount data Q by using a predetermined function $f(V_Q)$. Then, at step 1103, the intake air amount data Q is stored in the RAM, thereby completing this routine at step 1104. Note that, the calculated intake air amount Q stored in the RAM may be used in a fuel injection amount control routine, an ignition timing control routine, or the like.

Figure 12:
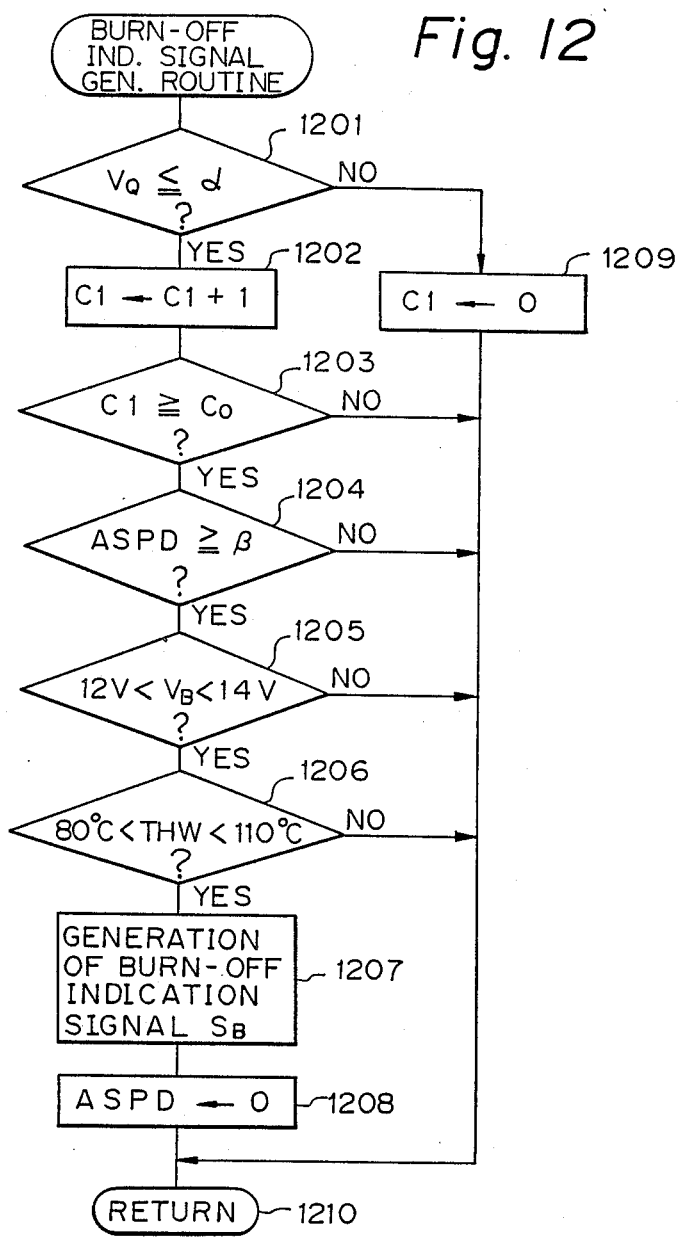

In FIG. 12, which is a routine for generating a burn-off indication signal $S_B$ executed at a predetermined time period such as 32 ms, at step 1201, the output voltage $V_Q$ of the sensor circuit 9 is fetched, and it is determined whether or not $V_Q \leq \alpha'$ (predetermined value) is satisfied, i.e., $Q \leq \alpha'$ (predetermined value) is satisfied. As a result, if $V_Q \leq \alpha$, the proceeds to step 1202 which counts up a timer counter C1 by $+1$, and if $V_Q > \alpha$, the control proceeds to step 1209 which resets the timer counter C1. Note that this timer counter C1 is constructed by designating an address area in the RAM of the control circuit 10, and is cleared by an initial routine. At step 1203, it is determined whether or not the value of the timer counter C1 has reached a predetermined value $C_0$ which corresponds to about 3 s. Only when $V_0 \leq \alpha$ and $C1 \leq C_0$ are satisfied, is the engine considered to be in an engine stalling state, so that the control proceeds to step 1204 to 1206. Steps 1204 to 1206 prevent a too-frequent burn-off operation from being carried out, that is, prevent damage to the film resistor 6. That is, at step 1204, a summed running distance ASPD is read out of the backup RAM, and it is determined whether or not ASPD $\geq \beta$ ($\beta$ corresponds to about 1000 km) is satisfied. Note that the travel distance ASPD is obtained by calculating a vehicle speed SPD from a signal of the vehicle speed sensor 12 and adding this vehicle speed SPD to the summed running distance ASPD in the backup RAM at a predetermined time period. At step 1205, an A/D conversion is performed upon the battery voltage $V_B$ of the battery 14, and the A/D converted value is fetched. Then, it is determined whether or not 12 V $< V_B <$ 14 V is satisfied. At step 1206, an A/D conversion is performed upon the coolant temperature THW of the coolant temperature sensor 13 and this A/D converted value is fetched. Then, it is determined whether or not 80° C. $<$ THW $<$ 110° C. As a result, only when all of the conditions at steps 1204 to 1206 are satisfied does the control proceed to step 1207, which generates a burn-off indication signal (pulse) and transmits that signal to the flip-flop 925 of the sensor circuit 9. Then, at step 1208, the summed running distance ASPD in the backup RAM is cleared, thus completing this routine at step 1210.

Figure 13:
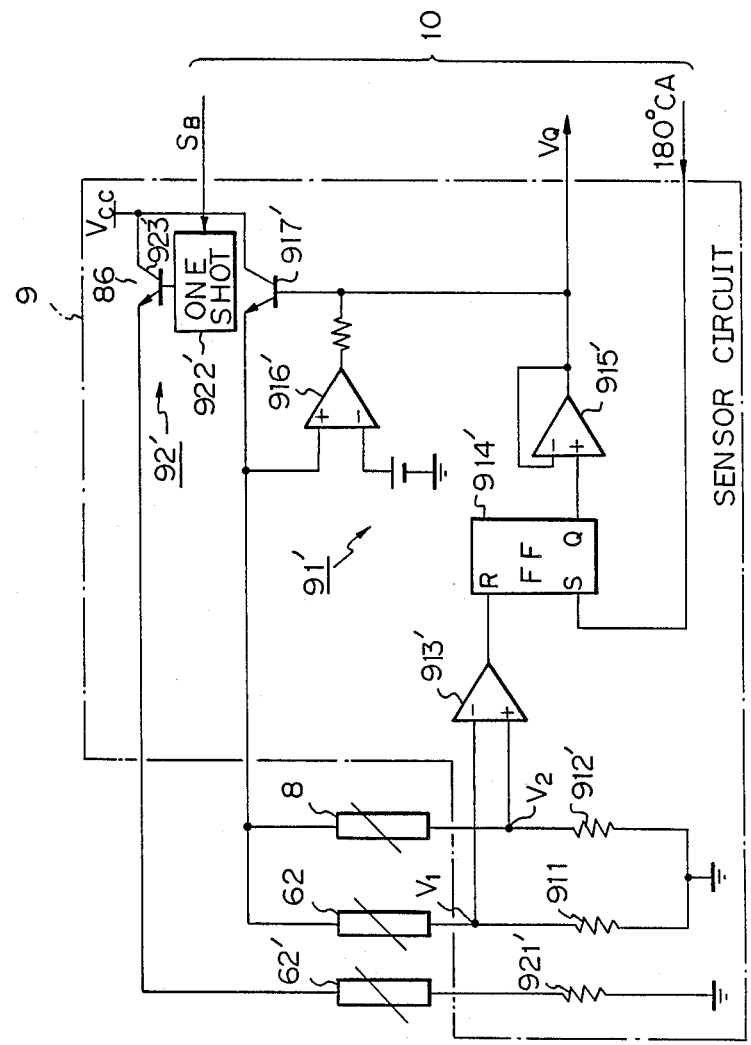
FIGS. 13 and 14 are circuit diagrams showing other examples of the sensor circuit of FIG. 1.
Figure 14:
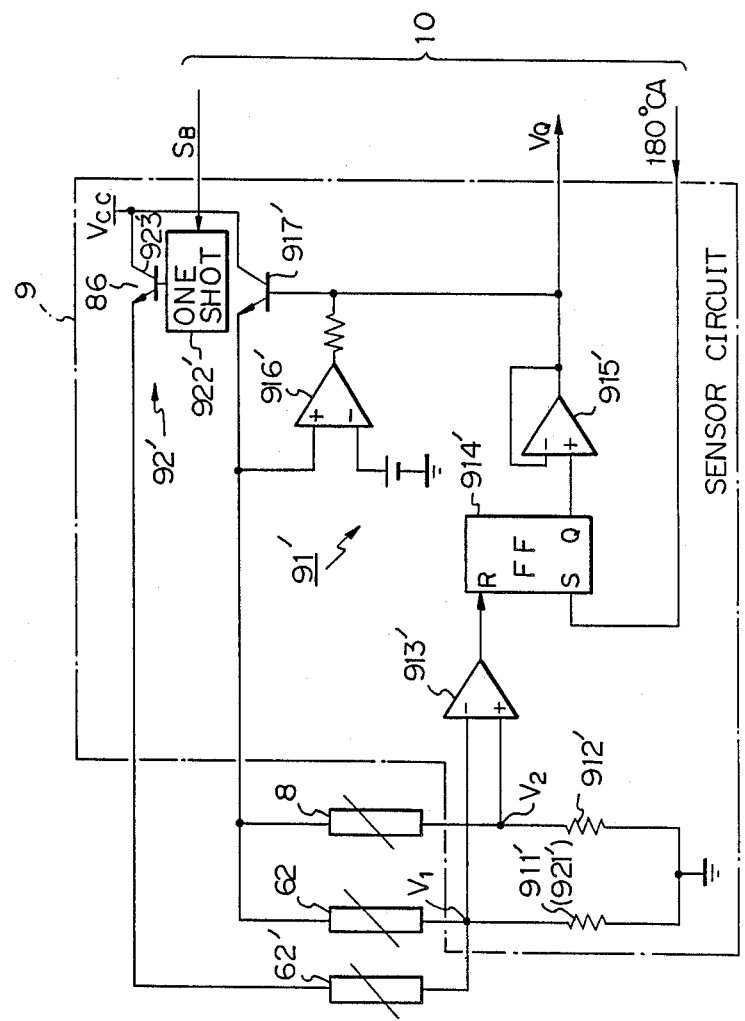

FIGS. 13 and 14 are modifications of FIGS. 9 and 10, respectively.

In FIG. 13, the sensor circuit 9 is comprised of a flow rate detection circuit 91' and a burn-off circuit 92'.

The flow rate detection circuit 91' includes resistors 911' and 912' which form a bridge circuit with the Pt resistance pattern layer 62 and the temperature-dependent resistor 8; and a comparator 913'; a flip-flop 914'; a voltage buffer 915'; a constant voltage generating circuit 916'; and a power transistor 917'. In this case, the constant voltage generating circuit 916' and the power transistor 917' are used for applying a constant voltage to the bridge circuit formed by the elements 62, 911', 8, and 912', and this application is controlled by the output of the flip-flop 914'. That is, when the flip-flop 914' is set by a 180° crank angle (CA) signal from the control circuit 10, an application of the constant voltage to the bridge circuit is initiated. Contrary to this, when the flip-flop 914' is reset, this application of the constant voltage to the bridge circuit is stopped. That is, a trigger pulse control is carried out.

Note that the resetting of the flip-flop 914' can be carried out at a predetermined time period.

The resetting of the flip-flop 914' is carried out by the output of the comparator 913'. That is, after the constant voltage is applied to the first bridge circuit by the setting of the flip-flop 914', both of the potentials $V_1$ and $V_2$ at the diagonal points of the bridge circuit are increased. As a result, when the temperature of the Pt resistance pattern layer 62 becomes higher than the temperature of he temperature-dependent resistor 8 by a constant value such as 90° C., i.e., the voltage $V_1$ is lower than the voltage $V_2$ determined by the temperature-dependent resistor 8, the output of the comparator 913' is switched from a low level to a high level, thereby resetting the flip-flop 914'. In this case, a time period T of the application of a constant voltage to the bridge circuit is determined by the speed of increase of the resistance value of the Pt resistance pattern layer 62, which speed also depends upon a part of the amount of heat generated from the Pt resistance pattern layer 62 dissipated to the air stream. Also, such a part of the amount of heat is determined by the intake air amount Q. Therefore, the time period T of the application of a constant voltage to the bridge circuit has the following relationship: T $\alpha \sqrt{Q}$ where K is a constant determined by the sensor circuit 9, the Pt resistance pattern layer 62, the temperature-dependent resistor 8, or the like. Therefore, a high potential output $V_Q$ of the flip-flop 914' is transmitted to the control circuit 10, so that the intake air amount Q is calculated, which will be later explained.

In FIG. 13, the burn-off circuit 92' includes a resistor 921' connected to the Pt resistance pattern layer 62', a one-shot multivibrator 922', and a power transistor 923'. Therefore, when the one-shot multivibrator 922' is triggered by a burn-off indication signal $S_B$ from the control circuit 10, the one-shot multivibrator 922' generates a pulse signal having a definite time period, so that the power transistor 923' is turned ON for this time period, thereby applying the power supply voltage $V_{CC}$ in series to the Pt resistance pattern layer 62' and the resistor 921'. As a result, the Pt resistance pattern layer 62' is heated to 400° C. to 800° C., thus removing suspended particles from the film resistor 6.

If the film resistor as illustrated in FIGS. 7A and 7B is used, the sensor circuit 9 of FIG. 13 is modified as illustrated in FIG. 14. In FIG. 14, the Pt resistance pattern layers 62 and 62' are commonly grounded by the resistor 911' (921'). Note that the operation of the sensor circuit 9 of FIG. 14 is the same as that of the sensor circuit 9 of FIG. 13.

The operation of the control circuit 10 of FIG. 1 wherein the sensor circuit 9 of FIG. 13 (or 14) is used will be explained with reference to FIGS. 15 and 17.

Figure 15:
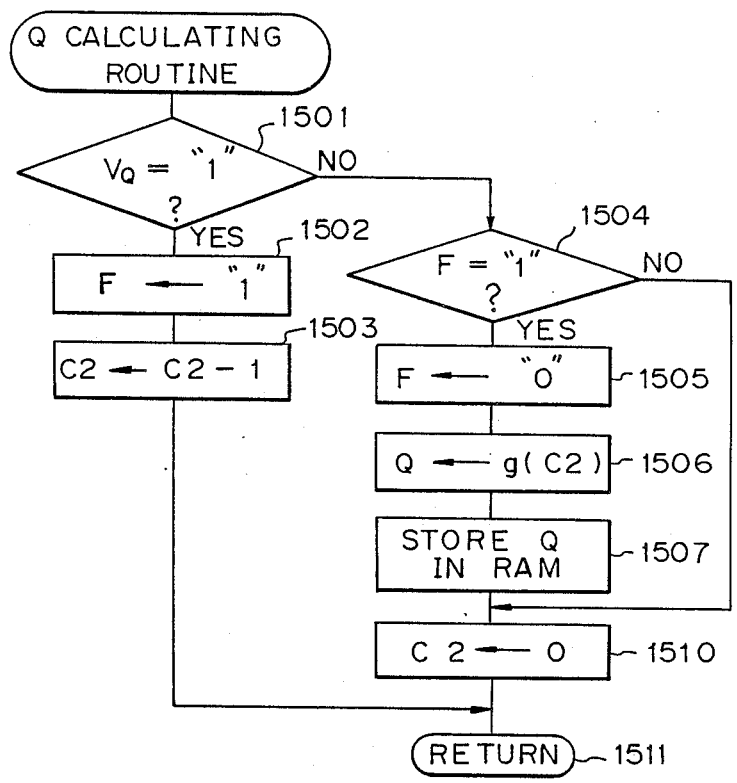
FIGS. 15 and 16 are flowcharts showing the operation of the control circuit of FIG. 1, where the sensor circuit of FIGS. 13 or 14 is applied to the sensor circuit of FIG. 1; and, FIGS. 16A, 16B, and 16C are timing diagrams explaining the flowchart of FIG. 15.
Figure 16A:
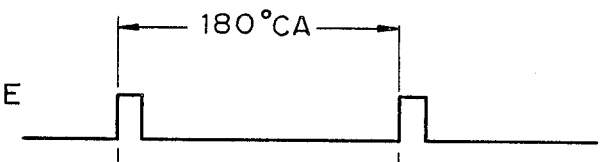

In FIG. 15, which is a routine for calculating an intake air amount Q executed at predetermined time periods, at step 1501, it is determined whether or not the sensing output voltage $V_Q$ is high ("1"). If $V_Q$ is high, the control proceeds to step 1502 which sets a flag F and, then at step 1503, a timer counter C2 is counted up by +1. Note that this timer counter C1 is constructed by designating an address area in the RAM of the control circuit 10, and is cleared by an initial routine. Thus, this routine is completed by step 1511. Note that the flag F (="1") as shown in FIG. 16C shows the state of the flip-flop 914' set by a 180° CA signal as shown in FIG. 16A.

Figure 16B:
Figure 16C:
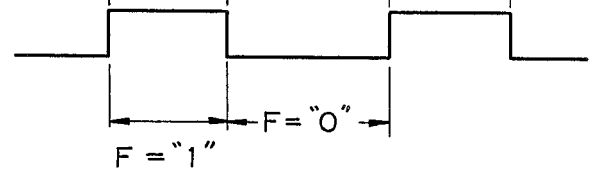

Next, when the flip-flop 914' is reset by the output of the OR circuit 913' as shown in FIG. 16B, the sensing output voltage $V_Q$ is also changed from high to low. Therefore, when the routine of FIG. 15 is again carried out, the flow at step 1401 proceeds to step 1504 which determines whether or not the flag F is "1". In this case, F="1", and accordingly, the control proceeds to step 1405 which clears the flag F. Then, at step 1506, the intake air amount Q is calculated by using a function g(C2), and the calculated amount Q is stored in the RAM by step 1507. Then, at step 1510, the timer counter C2 is cleared, and this routine is completed by step 1511.

When the routine of FIG. 15 is further carried out, the flow at step 1501 proceeds via step 1504 directly to step 1510 which clears the counter C2, since the flag F is "0".

Thus, the above-mentioned operation is repeated by every 180° CA signal.

Figure 17:
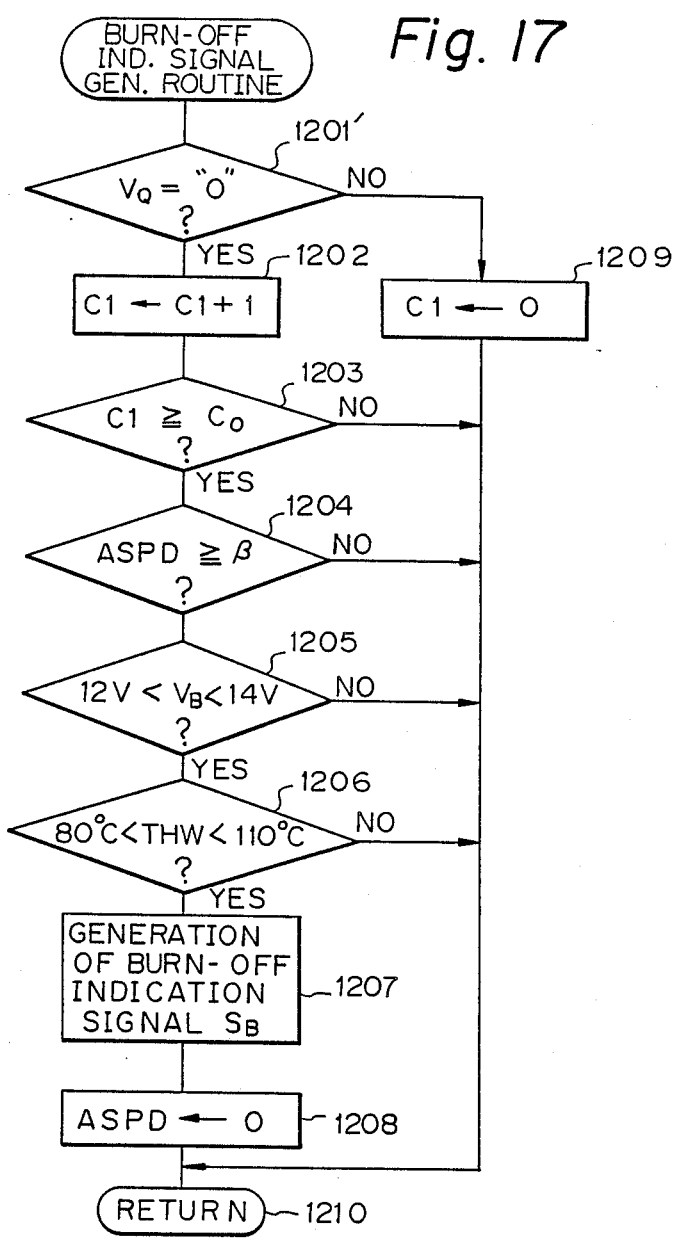

In FIG. 17, which is also a routine for generating a burn-off indication signal $S_B$ executed at every predetermined time period such as 32 ms, step 1201' is provided instead of step 1201 of FIG. 12. That is, steps 1201', 1202 1203, and 1209 determine whether or not 3s after the generation of a final output voltage $V_Q$ (="1") has passed, i.e., the engine is in a stalling state. Therefore, the routine of FIG. 17 is substantially the same as that of FIG. 12.

Note that the above-mentioned burn-off indication signal $S_B$ can be generated every time the ignition switch 15 is turned OFF.

As explained above, according to the present invention, since deposits formed by suspended particles are effectively burned off by turning ON the Pt resistance pattern layer for the burn-off, deposits due to the adhesion of suspended particles can be avoided or reduced, thereby improving the sensitivity and response speed of the sensor.

We claim:

1. A flow measuring apparatus comprising:
    a planar plate-type substrate provided within a stream path through which a fluid flows;
    means for supporting said substrate within said stream path so that said substrate is in parallel with said stream path of said fluid;
    first resistance layer means, provided on said substrate, for measuring a flow rate of said fluid;
    second resistance layer means, provided on a portion of said substrate upstream of said first layer means with respect to said stream path of said fluid, for burning away deposits adhered to said substrate; and
    burn-off current supply means for supplying current to said second resistance layer means to burn away the deposits.

2. An apparatus as set forth in claim 1, wherein said second resistance layer means is disposed on the upstream side of said first resistance layer means.

3. An apparatus as set forth in claim 2, wherein a part of said substrate on the upstream side is tapered, and said second resistance layer means is formed on said tapered portion of said substrate.

4. An apparatus as set forth in claim 1, wherein a lead portion of said first resistance layer means serves as a lead of said second resistance layer means.

5. An apparatus as set forth in claim 1, wherein said first resistance layer means is surrounded by said second resistance layer means.

6. An apparatus as set forth in claim 1, further comprising a passivation layer, provided between said first and said second resistance layer means, for protecting said first and second resistance layer means.

7. An apparatus as set forth in claim 6, wherein said passivation layer is split into a first portion formed on said first resistance layer means and a second portion formed on said second resistance layer means.

8. An apparatus as set forth in claim 6, wherein said passivation layer comprises:
    a first passivation layer formed on said first resistance layer means, said second resistance layer means being formed on said first passivation layer; and
    a second passivation layer formed on said second resistance layer means and on said first passivation layer,
    said second resistance layer means being thereby partly stacked on said first resistance layer means.

9. An apparatus as set forth in claim 1, wherein said first and second resistance layer means are formed on a same plane as said substrate.

10. An apparatus as set forth in claim 1, wherein said first resistance layer means comprises first heat generating portion means for generating heat when current is supplied thereto.

11. An apparatus as set forth in claim 10, wherein said second resistance layer means comprises second heat generating portion means for generating heat when current is supplied thereto, an area of said substrate occupied by said second heat generating portion means being larger than an area of said substrate occupied by said first heat generating portion means.

12. An apparatus as set forth in claim 1, further comprising:
    first current control means for controlling current supplied to said first resistance layer means;
    second current control means for controlling the current supplied by said burn-off means to said second resistance layer means; and
    signal leading means for leading a signal in relation to a rate of flow of said fluid.

13. An apparatus as set forth in claim 12, wherein said second current control means controls the current supplied by said burn-off current supply means to start the supply of the current to said second resistance layer means when receiving a burn-off indication signal, and to stop the supply of the current to said second resistance layer means when the resistance value of said second resistance layer reaches a definite value.

14. An apparatus as set forth in claim 12, wherein said second current control means controls the current supplied by said burn-off current supply means so that the current is supplied to said second resistance layer means for a predetermined time-period when receiving a burn-off indication signal.

15. An apparatus as in claim 1 wherein said first resistance layer means is the only resistance used for flow rate measurement.

16. An apparatus as in claim 1 further comprising control means for energizing said second resistance layer means to burn deposits, said control means including means for:
    keeping a running sum of a running distance;
    determining a new value of said running distance at predetermined intervals of time, and adding said new running distance to said summed running distance; and
    beginning said burn off operation when a predetermined summed running distance is reached.

17. A flow measuring apparatus for use in an internal combustion engine, comprising:
    a substrate;
    first resistance layer means, formed on said substrate, for detecting a flow rate;
    second resistance layer means, formed on said substrate, for burning off deposits thereon;
    a passivation layer, formed on said first and second resistance layer means, for protecting said first and second resistance layer means;
    means for determining whether a traveled distance is larger than a predetermined value;
    means for determining whether or not a battery voltage is within a predetermined voltage range;
    means for determining whether or not an engine coolant temperature is within a predetermined temperature range;
    means for generating a burn-off indication signal when said traveled distance is larger than said predetermined value, said battery voltage is within said predetermined voltage range, and said engine coolant temperature is within said predetermined temperature range; and
    means for supplying current to said second resistance layer means when receiving said burn-off indication signal, the operation of said current supplying means being stopped when a resistance value of said second resistance layer means reaches a definite value.

* * * * *